United States Patent Office 3,267,086
Patented August 16, 1966

3,267,086
OLEFIN POLYMERIZATION IN PRESENCE OF TiCl$_{2.5-2.9}$ AND ALUMINUM TRIALKYL
Erik Tornqvist, Roselle, N.J., assignor to Esso Research and Engineering Company, a corporation of Delaware
No Drawing. Original application July 1, 1957, Ser. No. 668,842, now Patent No. 3,121,063. Divided and this application Apr. 18, 1963, Ser. No. 273,834
5 Claims. (Cl. 260—93.7)

This application is a division of copending application S.N. 668,842, filed July 1, 1957 and now Patent No. 3,-121,063.

This invention relates to novel polymerization catalysts, their use for polymerization of olefins, and the polymer derived therefrom. More particularly, it relates to improved modified catalysts comprising a homogeneous partially reduced compound of a reducible heavy metal of groups IV(b), V(b), VI(b) and VIII of the Periodic Table, in which the metal has an average valence state between two main valences, preferably between 1 and 2 units below its maximum valence, said compound being activated by an organometal compound or a hydride of a metal of groups II and III of the Periodic Table to form a catalyst useful for the polymerization of olefins, especially α-olefins and propylene in particular at atmospheric or moderate superatmospheric pressure to make solid polymers, especially those having a substantial proportion of crystalline constituents.

Catalysts have previously been prepared by combining TiCl$_3$ (amorphous or crystalline) with a suitable alkyl metal compound such as aluminum triethyl, aluminum triisobutyl, aluminum diethylchloride, etc. Under suitable conditions, such catalysts have been quite effective for the polymerization of α-olefins, such as ethylene and propylene. Various useful methods have been found for the preparation of the TiCl$_3$, notably reduction of TiCl$_4$ by various alkyl metals, metal hydrides, metals and hydrogen. In all cases the preparation has been found quite critical especially with respect to avoiding over-reduction resulting in partial or complete formation of TiCl$_2$. Indeed, very poor polymerization results both with respect to rates and polymer properties have often been attributed to partial over-reduction of the TiCl$_3$. This has resulted in the development of quite special and unique methods of obtaining preparations by alkylmetal reduction of TiCl$_4$ in which the titanium is in the pure trivalent state. The importance of having the titanium in its pure trivalent state is also stressed by F. Eirich and H. Mark in their review article, "Vinyl Type Polymerization on Solid Surfaces and With Complex Catalysts," J. Coll. Sci., 11, 748–766 (1956). On page 761 in said article these authors point out the following: "Obviously the composition of this catalyst (Ziegler type) can be widely varied by changing the molar ratio of TiCl$_4$ and AlR$_3$, but while the effectiveness of the catalyst increases and eventually levels off with decreasing this ratio, its mode of functioning is almost independent of composition. Finally, the same catalyst can be produced by dispersing TiCl$_3$ and AlClR$_2$ directly. Poorer catalysts result from combining other valence states of titanium and higher aluminumchloro alkyls." When metals or hydrogen are employed in the reduction the reaction conditions are usually such that no over-reduction will take place. As a matter of fact in many cases methods have been used which would only cause partial reduction of the TiCl$_4$, in which case the TiCl$_3$ formed would then be separated from the unreacted TiCl$_4$ in a second operation step.

This removal of TiCl$_4$ from the TiCl$_3$ formed is of utmost importance, as even small quantities, less than 1%, of TiCl$_4$ present will result in much lower catalysts activities and in the formation of polymers of poorer physical properties than would be obtained with pure TiCl$_3$, as will appear below in Examples 41 and 42. Depending on their method of preparation the TiCl$_3$ preparations used for the polymerization of α-olefins according to the above-mentioned methods may contain some other compounds in addition to TiCl$_3$. Indeed, the most active crystalline TiCl$_3$ catalysts have been made by methods which would result in the incorporation of certain amounts of other salts like AlCl$_3$ in the preparation. This, however, has to no extent lessened the requirement of having the titanium in the pure trivalent state.

Generally, TiCl$_2$ has been found to be inefficient as a catalyst. Depending upon its method of preparation it either forms only oily polymers or low yields of polymers of a very high molecular weight (300,000–500,000) together with a fairly large quantity, 25–50%, of amorphous, oily or waxy, polymer. Usually only amorphous polymer is formed when the TiCl$_2$ has been prepared by alkylmetal reduction of TiCl$_4$. The higher molecular weight polymer may or may not be obtained with catalysts containing crystalline TiCl$_2$ of the type prepared by metal reduction of TiCl$_4$ or thermal decomposition of TiCl$_3$, depending upon the particular polymerization procedure used.

It has now been found that, surprisingly under very special conditions, titanium halides can be prepared which have the titanium in an average valence state of between two and three and which are as active as or even more active than TiCl$_3$ for the polymerization of α-olefins, notably propylene, to high molecular weight crystalline polymers.

It is known that certain metals such as Al, Zn, Mg, Hg, Ag, As, Sn and Ti as well as hydrogen can reduce TiCl$_4$ to TiCl$_3$ under suitable conditions. In most cases fairly high temperatures above 400–1000° C. are necessary to obtain a complete reaction, although a few metals like Al and Hg may accomplish the reduction at lower temperatures, e.g. below 250° C. In addition the reduction may be catalyzed by certain salts like AlCl$_3$.

The preparation of TiCl$_2$ by metal or hydrogen reduction is much more complicated and can as a rule not be made unless very high temperatures, above about 600° C., are used. As a matter of fact most processes (U.S. Patent 2,706,153) suggest temperatures of about 1000–1200° C. and in some cases the use of a molten salt bath is suggested for homogenization of the reaction mixture. At these temperatures both TiCl$_3$ and TiCl$_2$ have an appreciable vapor pressure and the following equilibrium exists among others:

This has been made use of for the preparation of TiCl$_2$ from TiCl$_3$ at temperatures of about 600° C. and at very low pressures.

It is evident that mixtures of TiCl$_3$ and TiCl$_2$ can be prepared by only partial decomposition of the former compound under the conditions just mentioned. Similarly a mixture of these compounds could conceivably be made by using less than stoichiometric amounts of the reducing metal under conditions which would otherwise lead to the formation of TiCl$_2$. Both methods would be very expensive and difficult to control and presumably lead to a product of undefined character and of a large particle size. This, of course, is a result of the high temperatures used and the therewith following high vapor pressure of both TiCl$_3$ and TiCl$_2$.

A more homogeneous product of a small particle size could be expected if a temperature considerably below the sublimation temperatures of TiCl$_3$ and TiCl$_2$ could be used. At such a temperature the reduction would, however, only with difficulty go beyond the TiCl$_3$ stage. The reason for this is that any further reduction would have to take place between solid TiCl$_3$ and a solid metal. In order to obtain a homogenous final product some way of homogenizing the intermediate reaction products would be needed. Aluminum metal is capable of reducing TiCl$_3$ to TiCl$_2$ at a temperature below about 350° C., and the AlCl$_3$ formed during the reduction is liquid or gaseous at the reduction temperature if this is above about 195° C. This aids the homogenization of the reaction intermediates and makes it possible to prepare TiCl$_2$ by reduction of TiCl$_4$ with aluminum at as low a temperature as about 200° C.

It has now been found that TiCl$_n$ preparations in which $n$ has a value between about 2.0 and 3.0, e.g. 2.25 to 2.9, and preferably 2.5 to 2.8, can be made in a similar way by properly adjusting the TiCl$_4$/Al ratio. The reaction will easily take place at temperatures above about 200° C. and go to completion provided some kind of mild stirring or mixing is provided.

In carrying out the present invention, the reducing agent, e.g. aluminum, most suitably in finely divided form, and of high purity or freedom from undesired impurities, is preferably mixed with the titanium tetrachloride, or titanium trichloride, and then heated in a suitable pressure container capable of withstanding pressures up to about 10 atmospheres. The temperatures used for the reduction reaction should be about 190 to 400° C., preferably, for making TiCl$_{2.25-2.9}$, a temperature of about 200 to 250° C. The heating time should be inversely of the order of about a few minutes to 100 hours, preferably about 1 to 50 hours. The reduction may be carried out in a single step or in a plurality of steps, preferably with mixing or grinding or other homogenizing treatment between the steps, or even during the reduction.

Provision may be made to discharge, either continuously or intermittently, the gaseous aluminum chloride formed during the reduction reaction.

The proportions of materials to be used in effecting the reduction will, of course, vary with the value of $n$ desired in the TiCl$_n$ material, or in the co-crystallized material: TiCl$_n \cdot x$AlCl$_3$. The following equations give a general representation of the chemical reactions involved in reducing either TiCl$_4$ or TiCl$_3$ to the range of TiCl$_{2.25-2.9}$.

Equation 1

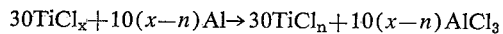

30TiCl$_x$ + 10($x-n$)Al → 30TiCl$_n$ + 10($x-n$)AlCl$_3$ where $x$ is an integer of 3 to 4, and $n$ is 2.25–2.9. As specifically applied for making TiCl$_{2.7}$ from TiCl$_4$, the following equation will give the molar proportions:

Equation 2

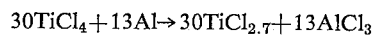

30TiCl$_4$ + 13Al → 30TiCl$_{2.7}$ + 13AlCl$_3$

The following table gives more in detail, the proportions to be used for making TiCl$_n$ having any value from 2.5 to 2.9, when starting with either TiCl$_4$ or from TiCl$_3$ and using aluminum as the sole reducing agent.

TABLE OF MOLAR PROPORTIONS OF MATERIALS FOR MAKING TiCl$_{2.5-2.9}$

| Starting Materials | | Products | |
|---|---|---|---|
| $n$ | TiCl$_4$ | Al | TiCl$_n$ | AlCl$_3$ |
| 2.9 | 30 | 11 | 30 | 11 |
| 2.8 | 30 | 12 | 30 | 12 |
| 2.7 | 30 | 13 | 30 | 13 |
| 2.6 | 30 | 14 | 30 | 14 |
| 2.5 | 30 | 15 | 30 | 15 |
| | TiCl$_3$ | | | |
| 2.9 | 30 | 1 | 30 | 1 |
| 2.8 | 30 | 2 | 30 | 2 |
| 2.7 | 30 | 3 | 30 | 3 |
| 2.6 | 30 | 4 | 30 | 4 |
| 2.5 | 30 | 5 | 30 | 5 |

Generically, the molar proportion of aluminum to be used per 30 moles of TiCl$_4$ or TiCl$_3$ starting material is equal to $10x(x-n)$.

As seen from the above equations and table, a substantial amount of AlCl$_3$ is formed during the reduction of the titanium chloride; some of this will be liberated in a gaseous form and some will remain co-crystallized with the TiCl$_{2.5-2.9}$. The amount of AlCl$_3$ thus liberated will of course depend upon the amount of AlCl$_3$ formed during the reaction, upon the reduction state of the titanium halide and upon the temperature and pressure in the reactor.

The details and advantages of the invention will be better understood from a consideration of the following experimental data.

In these experiments, a 300 ml. Aminco rocking steel bomb was used for the reaction which was carried out in two steps at about 220° C. with intermediate grinding and mixing of the reaction products as described in Example I. The total reaction time varied from about 7 hours to 35 hours although the actual reaction time as indicated by the recorded temperature-time relationship of the reaction was in the order of a few, 5–15 minutes. It will therefore be possible to use much shorter reaction times, in the order of 15 minutes or less, especially under more favorable conditions of mixing. Similarly it will be possible to complete the reaction in one step.

The products obtained proved not to be a simple mixture of TiCl$_3$ and TiCl$_2$ containing some AlCl$_3$ but rather to be new and defined compositions of matter in which the two titanium chlorides co-crystallized as evidenced by their X-ray diffraction patterns.

The X-ray diffraction patterns of the TiCl$_n$ preparations in which $n$ has a value of 2.67 or greater are similar to those of pure TiCl$_3$, or TiCl$_3$ containing some co-crystallized AlCl$_3$ inasmuch as they show peaks at the same angles of diffraction, indicating the same basic lattice spacings as in TiCl$_3$. However, the ratios between the intensities of the diffraction peaks differ from those of pure TiCl$_3$ indicating a different elemental composition. In particular the peaks primarily caused by diffraction between the chlorine layers of the TiCl$_3$ lattice (0, 0, 1) are relatively weaker than in the pure compound. This indicates either deficiencies in the chlorine layers of the crystal lattice or, which is more likely from the knowledge of the crystal structures of TiCl$_3$ and TiCl$_2$, more closely packed titanium atoms in the titanium layers.

The X-ray diffraction patterns of the TiCl$_n$ preparations in which $n$ has a value of 2.5 or less are similar to those of pure TiCl$_2$, indicating the same lattice spacings as in TiCl$_2$. However, here again the ratios between the intensities of the diffraction peaks differ from those of pure TiCl$_2$, indicating a different elemental composition.

This establishes the products of this invention as new and distinct compositions of matter.

The unusual composition and imperfect crystal structure of these materials may be responsible for their high catalyst activity. It is not known what type of reaction that takes place between the metal alkyl and the reduced titanium halide, e.g. $TiCl_n$, during the formation of the active catalyst. It may only be some kind of an adsorption, but it may also be a reaction involving a partial reduction on the surface of the titanium halide. If the latter is the case, one could expect a very easy alkyl metal activation of the new intermediate mixed valence titanium chlorides and a resulting high catalyst activity, provided the reduction has not gotten beyond a state at which the preparations have lost their original crystal structure.

Too strong a reduction by the activating alkyl metal compound, resulting in drastic changes in the crystal structure of the titanium chlorides, would most likely result in very finely divided catalysts of undefined structure and of low polymerization activity, similar to those obtained by over-reduction of $TiCl_4$ by $AlEt_3$. See Examples 23 and 24. It is, however, possible that on a very limited scale such a structure changing reduction may aid in the dispersion of the catalyst while still maintaining the original crystal structure of the individual particles formed. This may be another explanation for the great catalyst activity of the preparations of the $TiCl_{2.67}$ and $TiCl_{2.8}$ type. This is also indicated by the fact that the surface area of the new preparations seems to have little or no influence on their polymerization activity.

When the preparations have been made according to the methods outlined above, they will contain some included $AlCl_3$, the amount depending upon the degree of reduction and the extent to which $AlCl_3$ formed has been removed separately. The presence of smaller amounts of this and other salts may, however, aid the dispersion of the catalyst and be beneficial to the activity of the catalyst. When more $AlCl_3$ is present than is needed for good dispersion, the excess may be partly or completely removed by venting at atmospheric or reduced pressures or by other methods. This will lower the amount of metal alkyl required for the activation of the catalyst and also to some extent influence the properties of the polymer formed.

Obviously, part or all of the reduction of the $TiCl_4$ can be accomplished by other metals than aluminum or with hydrogen provided the reduction temperature can be kept below about 500° C. For instance, the first part of the reduction (to $TiCl_3$) can be carried out with titanium powder, and the last part with aluminum or any other reducing metal whose chloride is liquid or gaseous at the reaction temperature employed. Similarly a suitable mixture of aluminum and titanium could be used for carrying out the reduction in one step. In this case the $AlCl_3$ formed during the reaction will act as a catalyst for the further reduction with titanium making it possible to carry the reduction to completion at temperatures as low as about 200–250° C. By proper selection of the ratio between titanium and aluminum one may directly obtain a titanium chloride preparation of the desired average valence state as well as with the desired $AlCl_3$ content. Under certain conditions, systems requiring higher temperatures could also be used to prepare the new halides, although the control of the composition of the final product may be more complicated.

Although titanium chlorides have been used in the general description, other halides, e.g., bromides, oxyhalides and other salts of titanium as well as halides and other salts of other transition metal elements or mixtures of transition metal elements may be used for catalyst preparations according to this invention. For instance, one may use reducible compounds of other reducible transition metals of Group IV, V and VI, e.g. zirconium, hafnium, vanadium, niobium, tantalum, chrominum, molybdenum, and tungsten, and of Group VIII, e.g. iron. One very great advantage of these catalyst preparations, aside from their demonstrated high activity as polymerization catalyst and ease of preparation is that they will not contain small amounts of unreduced material such as $TiCl_4$ which may be present in a normal $TiCl_3$ preparation as the result of a slightly incomplete reaction or a slight overcharge of the material to be reduced, e.g. $TiCl_4$. Therefore the new preparations will be ready for use as catalyst without washing, with an inert solvent and following drying or any other treatment designed at removing undesirable compounds of the $TiCl_4$ type. This alone is a major improvement.

After the compound of a reducible heavy metal has thus been reduced as described above, the resulting reduced compound is then activated by an organometal compound of a metal of Groups II and III of the Periodic Table. This may be an aluminum trialkyl, which may have 2 to 20 carbon atoms, preferably 2 to 8 carbon atoms in the alkyl groups, and these alkyl groups may be like or unlike, e.g. aluminum triethyl, aluminum tripropyl, aluminum diethyl monoisobutyl, or -monoisooctyl, etc. Also, various aluminum dialkyl monohalides may be used, e.g. aluminum diethyl monochloride, aluminum diethyl monobromide, aluminum ethyl propyl monochloride, aluminum triisobutyl, or other substituted aluminum alkyl compounds such as methoxy aluminum diethyl or derivatives having the general formula $AlR_2X$ where X may be secondary amine, acid amide, mercaptan, thiophenol, etc., or more broadly other reducing componds of metals of the second and third groups of the Periodic Table such as zinc and magnesium hydrocarbon halides or zinc and magnesium dialkyl, or -aryl compounds, or any of these compounds together with an alkali metal or alloy, or an alkali metal hydride. In the preferred system, the alkyl group is derived from the olefin to be polymerized.

However, in atmospheric polymerizations alkyl metal compounds containing no halogen, e.g. aluminum trialkyls, magnesium dialkyls, zinc dialkyls, etc are most suitable. Of these the aluminum trialkyls, e.g. aluminum triethyl, aluminum tripropyl and aluminum triisobutyl are preferred.

In activating the reduced metal compound, e.g.

$$TiCl_{2.25-2.9}$$

with a metal organic compound, e.g. Al trialkyl, various proportions may be used. For instance, the molar Al/Ti ratio of these two constituents may range from 0.1 to 20, preferably about 0.3 to 2.0 mols of the Al trialkyl, or other organometal compound per mol of $TiCl_n$ or other partially reduced heavy metal compound.

For atmospheric polymerizations, the optimal molar ratio of alkylmetal compound to reduced transition metal compound normally depends upon the amount of soluble salt present in the catalyst preparation. In the specific case of a $TiCl_n$ preparation containing cocrystallized $AlCl_3$, the Al trialkyl may react with the $AlCl_3$ until all of the latter has been converted into $AlR_3Cl$ and has gone into solution. This of course will cause the desired fine or even colloidal dispersion of the $TiCl_n$. As aluminum dialkyl halides show little or no activation of the catalyst at atmoshperic pressure, enough Al trialkyl must be added so that it can convert the $AlCl_3$ to $AlR_2Cl$ and leave an additional amount to activate the TiCln catalyst.

The following type formula will show this more clearly:

$TiCl_n + XAlCl_3 + (Y+2X)AlEt_3$
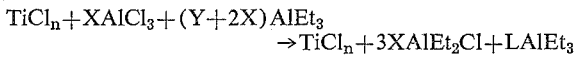

In this case Y must have a value above 0 and preferably 1 or higher. This is of course true, also; for other combinations of reduced Ti halides, Al halides and Al trialkyl compounds. To a certain extent it is also applied to other transition metal elements and metalorganic compounds used in this invention.

The preparation of the activated catalyst may be carried out in any desired manner, e.g. by adding a solution of the aluminum triethyl dissolved in a suitable solvent to a suspension of the reduced TiCl$_n$ catalyst constitutent at a suitable temperature ranging from 0 to 100° C. but preferably about 20 to 40° C., preferably with agitation to maintain the activated catalyst in a desired state of fine solid dispersion in the inert diluent.

The resulting activated dispersed catalyst is then ready for use in polymerizing propylene or other suitable olefins. This may be carried out by adding the olefin in either gaseous or liquid state, directly to the reactor containing the dispersed catalyst, preferably with constant agitation, the temperature being maintained within the range of about 0 to 150° C., normally about 60 to 120° C. This type of polymerization may be carried out batchwise or in a continuous manner. The pressure may be atmospheric, or slightly above atmospheric, e.g. up to 10 atmospheres or so. The polymerization may, however, also be carried out at a somewhat higher pressure, 20–50 atm. with all the olefin added to reactor prior to rasing the temperature to a level at which reaction will take place.

Besides ethylene and propylene, the catalyst may be used for polymerizing other alpha olefins, e.g. butene-1, hexene-1, octadecene-1, etc. and diolefins, e.g. terminal diolefins such as butadiene, isoprene, etc., as well as mixtures thereof.

*Examples 1–7*

The following table shows data from the preparation of 7 catalysts of the composition TiCl$_n$ in which $n$ had the values 2.25, 2.5, 2.67, 2.8 and 2.91. TiCl$_4$ was reduced by the calculated amount of atomized aluminum or mixture of atomized aluminum and titanium powder in a 300 ml. rocking bomb. In most cases two reaction periods with intermediate mixing or grinding were employed in order to obtain a complete reaction and a homogeneous product. This was desirable because of the lack of agitation in the rocking bombs. The reactions would of course have been easily carried out in one step in a more suitable type of equipment. The reaction times employed were of the order of several hours. However, the time-temperature relationship curves of the reactions indicated that they took place in a matter of a few minutes. It should be possible to realize such short reaction times in equipment provided with agitation. Some of the AlCl$_3$ formed during the reactions was condensed in an almost pure form at the top of the bomb and could be removed separately. The amount of AlCl$_3$ that could be removed in this manner could be controlled in a number of ways, particularly by proper adjustment of the temperature during the second reaction period and by applying air cooling to the top of the bomb toward the end of this period. In this way preparations with satisfactory AlCl$_3$ contents were obtained. The remaining material consisted of very finely divided compounds which were easily removed from the bomb. The reactions were in all cases complete and the yields practically quantitative, small losses occurring during the removal of the materials from the bombs. See Table I.

TABLE I (EXAMPLES 1–7)

[Preparation a of TiCl$_n$ catalysts where $n$ is 2.25–2.91]

| Example | 1 | 2 | 3 | 4 | 5 | 6 | 7 |
|---|---|---|---|---|---|---|---|
| Ti Chloride to be Formed | TiCl$_{2.91}$ | TiCl$_{2.8}$ | TiCl$_{2.8}$ | TiCl$_{2.67}$ | TiCl$_{2.67}$ | TiCl$_{2.5}$ | TiCl$_{2.25}$ |
| Starting Materials, Moles: | | | | | | | |
| TiCl$_4$ b | 1 | 1 | 1 | 1 | 1 | 1 | 1 |
| Ti c | | | 1/3 | | | | |
| Al d | 4/11 | 4/10 | 4/45 | 4/9 | 4/9 | 1/2 | 7/12 |
| Al/Ti ratio | 4/11 | 4/10 | 1/15 | 4/9 | 4/9 | 1/2 | 7/12 |
| Reaction Conditions: | | | | | | | |
| 1st Period: | | | | | | | |
| Max. Temp.,° C | 230 | 230 | 260 | 220 | 250 | 220 | 220 |
| Time, hrs | 3 | 18 | 6 | 4 | 14 | 14 | 12 |
| 2d Period: | | | | | | | |
| Max. Temp.,° C | 220 | 220 | 260 | 220 | 220 | 220 | 220 |
| Time, Hrs | 4 | 16.5 | 5 | 4 | 14 | 14 | 12 |
| Ball Milling Between Reaction Periods, days e | | | | | | 4 | 5 |
| Yield: | | | | | | | |
| Theoretical f | 188 | 178 | 208 | 176 | 178 | 178 | 173 |
| Recovered | 177 | 180 | 202 | 176 | 172 | 170 | 154 |
| Color of Product | | | | | | | |
| Mole Ratio of Final Product TiCl$_n$/ AlCl$_3$ | 1/0.28 | 1/0.24 | 15 | 1/0.25 | 1/0.26 | 1/0.23 | 1/0.31 | a 300 ml. rocking bomb was used.
b Stauffer's or Baker's purified.
c Metal Hydride's Y-1978-A, vacuum dried.
d Alcoa atomized grade #140.
e Homogenization was accomplished in a mortar when no ball milling was employed.
f Calculated from total charge minus AlCl$_3$ recovered at top of bomb. All yields were practically quantitative but losses occurred when removing materials from bombs or ball mill jars.

The color of the materials was purple to purplish-brown for TiCl$_{2.91}$, TiCl$_{2.8}$ and TiCl$_{2.67}$ but darkened to sepia for TiCl$_{2.5}$ and brownish black for TiCl$_{2.25}$. The crystal structure of the TiCl$_{2.91}$, TiCl$_{2.8}$ and TiCl$_{2.67}$ preparations was similar to that of TiCl$_3$ as evidenced by their X-ray diffraction patterns which showed peaks at the same angles of diffraction as that of pure TiCl$_3$, indicating the same basic lattice spacings in all these compounds. However, the relative intensities of the diffraction peaks were different from those of TiCl$_3$, indicating a different elemental composition.

The crystal structure of TiCl$_{2.5}$ and TiCl$_{2.25}$ was similar to that of TiCl$_2$ as evidenced by the appearance of X-ray diffraction peaks at the same angles of diffraction in all three preparations. The relative intensities of the diffraction peaks varied, however, for the three preparations indicating different elemental compositions in the three preparations. Thus, all the new preparations had definite crystal structures although their compositions did not correspond to any of the two known sub-chlorides of titanium, i.e. TiCl$_3$ and TiCl$_2$. They are therefore new and distinct compositions of matter.

*Examples 8–38*

Six of the catalysts prepared according to Examples 1–7 were tested for their catalyst activity in propylene polymerizations using AlEt$_3$ as the activator (Examples 8–27). Data from these polymerizations are given in Tables II–IV. For the purpose of getting a direct comparison between the new catalysts and previously used TiCl$_3$ and TiCl$_2$ catalysts, a number of similar propylene polymerizations were made with the latter type of catalysts which had been prepared either by hydrogen, aluminum or aluminum-titanium reduction of $TiCl_4$. (Examples 28–38.) Data from these polymerizations are given in Tables V and VI.

In all the polymerizations reported in Examples 8–38, 300 ml. or 1 l. Aminco steel bombs were used as the polymerization reactors. The polymerization procedure was as follows. The catalyst was charged to the bombs in a dry box containing purified (oxygen and moisture free) nitrogen in the following manner. The weighed titanium halide was suspended in a measured volume (30 ml. for 300 ml. bombs and 50 ml. for 1 l. bombs) of dry n-heptane and the desired amount of $AlEt_3$ was added as a 0.88 molar solution in n-heptane to the suspension. The catalyst suspension was then transferred to the polymerization bomb, which was then closed and transferred to the heating rocker and connected to the propylene feed system. The desired amount (100 g. in 300 ml. bombs and 200 g. in 1 l. bombs) of purified (by passing through a BaO tower and a scrubber containing 25% triisobutyl aluminum in a paraffin oil) propylene was condensed in an intermediate bomb using a Dry-Ice-isopropanol bath as the cooling medium. The accuracy of the metering system used for the propylene condensation was about ±5%. The condensed propylene was introduced into the bomb with nitrogen gas and pressured up to 400 p.s.i.g. to insure complete monomer transfer. Heat was then applied to the rocker and the rocker motor started. The temperature of the bomb was allowed to rise to 80° C. This took about 0.5–1 hr. somewhat depending upon the rate of reaction. The bomb was then kept at this temperature for about 6–12 hours. Although the actual polymerization time was much shorter as evidenced by the time-pressure relationship in the bombs the longer reaction time was used in order to realize the full potentialities of the catalysts. The bombs were then allowed to cool, removed from the rockers, opened and the polymer recovered.

A complete conversion of the propylene charged was obtained in the polymerizations where a moderate catalyst concentration was used. It was therefore necessary to reduce the catalyst concentration drastically in order to realize the full potentialities of the extremely active $TiCl_n$-$XAlCl_3$ catalysts. High $AlEt_3/TiCl_n$ ratios had to be used at these low catalyst concentrations in order to prevent inactivation of the catalyst by traces of poisons, air and moisture in particular. Under these conditions small variations in the amount of $TiCl_n$ used (45–70 mg. in 1 l. bombs) has a great influence on the total catalyst efficiency. The catalyst efficiency calculated on the $TiCl_n$ portion of the catalyst is, however, not influenced thereby. Therefore the latter values become the most significant ones. The results are of course clear cut when there is a difference in efficiency calculated both on total catalyst and on $TiCl_n$ at constant $AlEt_3$ levels. The polymerization and product evaluation data are shown in the following tables.

TABLE II.—POLYMERIZATION OF PROPYLENE WITH $TiCl_{2.91}$ AND $TiCl_{2.8}$ CATALYSTS IN ROCKING BOMB

| Example No | 8 | 9 | 10 | 11 | 12 | 13 | 14 | 15 |
|---|---|---|---|---|---|---|---|---|
| Bomb Size, l | 0.3 | 0.3 | 0.3 | 0.3 | 0.3 | 1 | 0.3 | 0.3 |
| Feed and Diluent Components: | | | | | | | | |
| Propylene, g.[a] | 100 | 100 | 100 | 100 | 100 | 200 | 100 | 100 |
| n-Heptane, ml | 30 | 30 | 30 | 30 | 30 | 50 | 30 | 30 |
| Catalyst: | | | | | | | | |
| Titanium Halide, Example No | 1 | | | 2 | | | | 2 |
| Type | $TiCl_{2.91}$-0.28 $AlCl_3$ [b] | | | $TiCl_{2.8}$-0.24 $AlCl_3$ | | | | $TiCl_{2.8}$-0.24 $AlCl_3$ |
| Weight, mg | 250 | 10.9 | 400 | 300 | 300 | 44.9 | 17.6 | 11.4 |
| $AlEt_3$, mg.[c] | 400 | 100 | 600 | 590 | 590 | 200 | 100 | 50 |
| Al/Ti Mole Ratio [d] | 2.7 | 15.0 | 2.4 | 2.1 | 2.1 | 6.9 | 8.9 | 6.9 |
| Reaction Conditions: | | | | | | | | |
| Catalyst Conc., g./l | 413 | 0.74 | 6.7 | 5.9 | 5.9 | 0.82 | 0.78 | 0.41 |
| Average Temperature, °C | 80 | 80 | 80 | 80 | 80 | 80 | 80 | 80 |
| Run Length, hr.[e] | 16 | 12 | 8 | 8 | 7 | 8 | 12 | 8 |
| Results: | | | | | | | | |
| Total Polymer, g | 85 | 37.7 | 104 | 94 | 93 | 169 | 98 | 40.6 |
| Waxy Polymer, percent | 3.5 | 4.7 | 3.6 | 4.6 | 5.4 | 1.6 | 0.8 | 2.9 |
| Catalyst Efficiency, g./g.: | | | | | | | | |
| On Total Catalyst | 130 | 340 | 104 | 106 | 104 | 690 | 830 | 660 |
| On $TiCl_n$ | 420 | 4,300 | 315 | 380 | 375 | 4,560 | 6,730 | 4,320 |
| Properties of Solid Polymer: | | | | | | | | |
| Mol. Wt. $\times 10^{-3}$ | 117 | 340 | 225 | 140 | 200 | 170 | 202 | 160 |
| Heptane Insolubles, percent | 61.8 | 74.0 | 73 | 70.3 | 76.3 | 65.5 | 69.5 | 66.3 |
| Soft. Pt./Melt. Pt., °C | 163/172 | 155/167 | 160/170 | 160/165 | 160/170 | 149/163 | 145/160 | 136/157 |
| Tensile Strength, p.s.i | 3,420 | | 3,260 | 3,550 | 3,570 | 3,010 | 3,420 | 2,640 |
| Elongation, percent | 80 | | 90 | 240 | 60 | 70 | 50 | 80 |
| Ash, percent | | 0.064 | | | | <0.001 | 0.037 | 0.010 |

[a] Measured by pressure drop as propylene condensed and therefore an approximate weight.
[b] Orig. preparation used in Ex. 8 (surface area 3.2 m.²/g.). Ball-milled fraction used in Ex. 9 (surface area 23.3 m.²/g.).
[c] Added as 0.88 M solution in n-heptane.
[d] Does not include $AlCl_3$ in $TiCl_n$ preparations.
[e] The actual polymerization time was usually much shorter than the time used.

TABLE III.—POLYMERIZATION OF PROPYLENE WITH $TiCl_{2.67}$ CATALYSTS IN ROCKING BOMB

| Example No | 16 | 17 | 18 | 19 | 20 | 21 | 22 | 23 | 24 |
|---|---|---|---|---|---|---|---|---|---|
| Bomb Size, l | 1 | 1 | 1 | 1 | 1 | 1 | 0.3 | 0.3 | 0.3 |
| Feed and Diluent Components: | | | | | | | | | |
| Propylene, g.[a] | 300 | 280 | 200 | 200 | 200 | 200 | 100 | 100 | 100 |
| n-Heptane, ml | 100 | 50 | 50 | 50 | 50 | 50 | 30 | 30 | 30 |
| Catalyst: | | | | | | | | | |
| $TiCl_{2.67}$, Example No | 4 | 4 | 4 | 4 | 4 | 5 | 5 | 4 | 4 |
| Type | $TiCl_{2.67}$-0.25 $AlCl_3$ [b] | | | | | $TiCl_{2.67}$-0.26 $AlCl_3$ [c] | | $TiCl_{2.67}$-0.25 $AlCl_3$ [b] | |
| Weight, mg | 500 | 200 | 100 | 50 | 44.2 | 25.9 | 10.7 | 13.3 | 13.8 |
| $AlEt_3$, mg.[d] | 800 | 400 | 400 | 400 | 200 | 100 | 100 | 100 | 50 |
| Al/Ti mole ratio [e] | 1.9 | 3.1 | 6.2 | 12.4 | 7.0 | 6.0 | 14.5 | 11.6 | 5.6 |
| Reaction Conditions: | | | | | | | | | |
| Catalyst Conc., g./l | 2.6 | 2.0 | 1.7 | 1.5 | 0.81 | 0.42 | 0.74 | 0.76 | 0.43 |
| Average Temp., °C | 80 | 80 | 80 | 80 | 80 | 80 | 80 | 80 | 80 |
| Run Length, hrs.[f] | 6 | 3 | 1.5 | 2 | 12 | 12 | 12 | 8 | 8 |
| Results: | | | | | | | | | |
| Total Polymer, g | >109 | [g] 278 | 196 | 165 | [h] 224 | 134 | 23.3 | 44.6 | 49.3 |
| Waxy Polymer, percent | ? | 0.25 | 0.4 | 1.8 | 1.8 | 2.0 | 5.6 | 1.8 | 2.6 |
| Catalyst Efficiency, g./g.: | | | | | | | | | |
| On Total Catalyst | >84 | 464 | 390 | 330 | 915 | 1,060 | 210 | 395 | 775 |
| On $TiCl_{2.67}$ | >218 | 1,720 | 2,400 | 4,070 | 6,250 | 6,400 | 2,700 | 4,130 | 4,410 |
| Properties of Solid Polymer: | | | | | | | | | |
| Mol. Wt. $\times 10^{-3}$ | 170 | 114 | 154 | 215 | 314 | 254 | 230 | 185 | 165 |
| Heptane Insolubles, percent | 68 | 63.7 | 68.4 | 70.7 | 63.8 | 64.0 | 64.8 | 69.4 | 63.4 |
| Soft. Pt./Melt. Pt | 156/166 | 155/164 | 143/163 | | 149/160 | 153/170 | 150/172 | 146/164 | 145/158 |
| Tensile Strength, p.s.i | 3,360 | 2,960 | 2,990 | | 2,540 | 2,250 | | 3,050 | 2,240 |
| Elongation, percent | 230 | 150 | 940 | | 120 | 90 | | 80 | 720 |
| Ash, percent | | 0.097 | 0.140 | 0.03 | 0.027 | 0.090 | 0.069 | 0.015 | 0.006 |

[a] Measured by pressure drop as propylene condensed and therefore an approximate weight.
[b] Original preparation, surface area 3.4 m.$^2$/g.
[c] Ball-milled preparation, surface area 44.7 m.$^2$/g.
[d] Added as 0.88 M solution in n-heptane.
[e] Does not include $AlCl_3$ in $TiCl_{2.67}$ preparation.
[f] The actual polymerization time was usually much shorter than the time used.
[g] 280 g. propylene charged to bomb.
[h] 220 g. propylene charged to bomb.

TABLE IV.—POLYMERIZATION OF PROPYLENE WITH $TiCl_{2.25}$ and $TiCl_{2.5}$ CATALYST IN ROCKING BOMB

| Example No | 25 | 26 | 27 |
|---|---|---|---|
| Bomb Size, l | 0.3 | 0.3 | 1 |
| Feed and Diluent Components: | | | |
| Propylene, g.[a] | 100 | 100 | 200 |
| n-Heptane, ml | 30 | 30 | 50 |
| Catalyst: | | | |
| Titanium Halide, Example | 7 | 6 | 6 |
| Type | $TiCl_{2.25}$-0.31 $AlCl_3$ [c] | $TiCl_{2.5}$-0.23 $AlCl_3$ [e] | |
| Weight, mg | 13.6 | 10.0 | 57.1 |
| $AlEt_3$, mg.[f] | 100 | 100 | 200 |
| Al/Ti mole Ratio [g] | 11.3 | 13.7 | 5.1 |
| Reaction Conditions: | | | |
| Catalyst Conc., g./l | 0.76 | 0.73 | 0.86 |
| Ave. Temp., °C | 80 | 80 | 80 |
| Run Length, Hrs. [h] | 6 | 8 | 6 |
| Results: | | | |
| Total Polymer, g | 44.8 | 57.2 | 199 |
| Waxy Polymer, percent | 0.67 | 0.4 | 0.15 |
| Catalyst Efficiency, g./g.: | | | |
| On Total Catalyst | 395 | 520 | 780 |
| On $TiCl_n$ | 4,500 | 7,015 | 4,410 |
| Properties of Solid Polymer: | | | |
| Mol. Wt. $\times 10^{-3}$ | 300 | 310 | 250 |
| Heptane Insoluble, percent | | 73.7 | |
| Soft. Pt./Melt. Pt., °C | 149/162 | 142/159 | 145/162 |
| Tensile Strength, p.s.i | 2,060 | 2,600 | 2,120 |
| Elongation, percent | 175 | 80 | 235 |
| Ash, percent | | 0.003 | |

[a] Measured by pressure drop as propylene condensed and therefore an approximate weight ($\pm 5\%$).
[c] Ball milled preparation. Surface area 22 m.$^2$/g.
[e] Ball milled preparation. Surface area 33 m.$^2$/g.
[f] Added as 0.88 M solution in n-heptane.
[g] Does not include $AlCl_3$ in $TiCl_n$ preparations.
[h] The actual polymerization time was usually much shorter than the time used.

TABLE V.—POLYMERIZATION OF PROPYLENE WITH TiCl₃ CATALYSTS IN ROCKING BOMB

| Example No | 28 | 29 | 30 | 31 | 32 | 33 | 34 | 35 | 36 |
|---|---|---|---|---|---|---|---|---|---|
| Bomb Size, l | 1 | 1 | 0.3 | 0.3 | 0.3 | 0.3 | 0.3 | 0.3 | 0.3 |
| Feed and Diluent Components: | | | | | | | | | |
| Propylene, g.[a] | 200 | 200 | 100 | 100 | 100 | 100 | 100 | 107 | 100 |
| n-Heptane, ml | 50 | 50 | 30 | 30 | 30 | 30 | 30 | 30 | 30 |
| Catalyst: | | | | | | | | | |
| TiCl₃, Type | Pure [b] | Pure [b] | Pure [b] | Pure [b] | Pure [b] | Pure [b] | Pure [c] | Ti Cl₃-0.33 Al Cl₃ [d] | Ti Cl₃-0.2 Al Cl₃ [e] |
| Weight, mg | 70 | 53.5 | 500 | 250 | 100 | 41.1 | 12.4 | 52.0 | 46.6 |
| AlEt₃, mg | 200 | 200 | 370 | 370 | 300 | 150 | 100 | 100 | 100 |
| Al/Ti Mole Ratio [f] | 3.8 | 5.1 | 1.0 | 2.0 | 3.3 | 5.0 | 10.9 | 3.4 | 3.4 |
| Reaction Conditions: | | | | | | | | | |
| Catalyst Conc., g/l | 0.9 | 0.84 | 5.8 | 4.1 | 2.7 | 1.3 | 0.75 | 1.0 | 0.98 |
| Average Temperature | 80 | 80 | 80 | 80 | 80 | 80 | 80 | 80 | 80 |
| Run Length, hrs.[g] | 12 | 8 | 16 | 3 | 2 | 12 | 6 | 6 | 6 |
| Results: | | | | | | | | | |
| Total Polymer, g | 179 | 135 | >88 | 114 | 83 | 98 | 22.0 | 90 | 100 |
| Waxy Polymer, percent | 0.8 | 0.5 | ? | 0.2 | 2.3 | 2.3 | 2.3 | 2.9 | 1.8 |
| Catalyst Efficiency, g/g: | | | | | | | | | |
| On Total Catalyst | 665 | 531 | >101 | 184 | 207 | 514 | 195 | 590 | 680 |
| On TiCl$_n$ | 2,560 | 2,520 | >176 | 455 | 830 | 2,400 | 1,770 | 2,230 | 2,510 |
| Properties of Solid Polymer: | | | | | | | | | |
| Mol. Wt. ×10⁻³ | 225 | 215 | 305 | 167 | 195 | 335 | 260 | 148 | 167 |
| Heptane Insolubles, percent | 69.0 | 64.9 | 67.0 | 70 | 73 | 66.1 | | 61.2 | 67.3 |
| Soft. Pt./Melt. Pt., °C | 158/166 | 146/162 | | | | 145/165 | | 148/158 | 152/162 |
| Tensile Strength, p.s.i | 3,070 | 2,470 | | | | 2,320 | | 2,390 | 2,940 |
| Elongation, percent | 80 | 240 | | | | 110 | | 220 | 230 |
| Ash, percent | 0.030 | <0.001 | | 0.136 | 0.07 | 0.035 | | 0.030 | 0.042 |

[a] Measured by pressure drop as propylene condensed and therefore an approximate weight.
[b] Prepared by hydrogen reduction above 600° C. (platinum filament). Surface area 25.4 m.²/g.
[c] Prepared by hydrogen reduction above 600° C. (iridium filament). High surface area.
[d] Ball milled to surface area 96.5 m.²/g.
[e] Ball milled to surface area 6.4 m.²/g.
[f] Does not include AlCl₃ in TiCl₃ preparation.
[g] The actual polymerization time was usually much shorter than the time used.

TABLE VI.—POLYMERIZATION OF PROPYLENE WITH TiCl₂ CATALYSTS IN ROCKING BOMB

| Example No | 37 | 38 |
|---|---|---|
| Bomb Size, l | 0.3 | 0.3 |
| Feed and Diluent Components: | | |
| Propylene, g.[a] | 100 | 100 |
| n-Heptane, ml | 30 | 30 |
| Catalyst: | | |
| Titanium Halide | 1207-38 | 1207-38 |
| Type | TiCl₂-0.08 AlCl₃ [b] | |
| Weight, mg | 500 | 300 |
| AlEt₃, mg [c] | 725 | 450 |
| Al/Ti Mole Ratio [d] | 1.65 | 1.7 |
| Reaction Conditions: | | |
| Catalyst Conc., g./l | 8.3 | 5.0 |
| Avg. Temperature, °C | 82 | 80 |
| Run Length, Hrs.[e] | 7 | 16 |
| Results: | | |
| Total Polymer, g | 30.5 | 17.0 |
| Waxy Polymer, percent | 23 | 5.9 |
| Catalyst Efficiency, g./g.: | | |
| On Total Catalyst | 24.4 | 22.6 |
| On TiCl$_n$ | 61.5 | 57 |
| Properties of Solid Polymer: | | |
| Mol. Wt. ×10⁻³ | 450 | 460 |
| Heptane Insoluble, percent | 92.8 | 80.3 |
| Soft. Pt./Melt. Pt., °C | 164/180 | |
| Tensile Strength, p.s.i | 4,930 | |
| Elongation, percent | 0 | |
| Ash, percent | | |

[a] Measured by pressure drop as propylene condensed and therefore an approx. wt.
[b] Surface area 11.3 m.²/g.
[c] Added as 0.88 M solution in n-heptane.
[d] Does not include AlCl₃ in TiCl$_n$ preparations.
[e] The actual polymerization time was usually much shorter than the time used.

The data in Tables II–VI clearly show the superiority of the new TiCl$_n$ preparations. This is still more apparent upon inspection of the summary data from the best polymerizations as listed in Table VII. Especially striking are the efficiencies obtained with the TiCl$_n$-$x$AlCl₃ catalysts in which $n$ has a value of 2.5–2.8. In these cases efficiencies were obtained in the order of about 700–1050 g./g. calculated on total catalyst and about 4400–7000 g./g. calculated on the TiCl$_n$ portion. In contrast to this none of the TiCl₃ or TiCl₃-AlCl₃ catalysts gave higher efficiencies than about 680 g./g. calculated on total catalyst and about 2550 calculated on the TiCl₃ portion. It should be noted that the TiCl$_{2.67}$ catalyst seems sensitive to too high AlEt₃/TiCl$_n$ ratios as indicated by the higher efficiencies obtained in Example 24 as compared to Example 23. Actually the reduction in the AlEt₃ level caused an increased polymer yield although the amount of TiCl$_{2.67}$-0.25 AlCl₃ remained constant. The reason for this may be that the TiCl$_{2.67}$ which still has the basic structure of TiCl₃ is further reduced at the higher Al/Ti ratios resulting in a structure change and a poor catalyst of undefined character. Only a slight reduction should be needed as TiCl$_{2.5}$ appears to have a structure closely related to TiCl₂.

The surface area of most of the catalyst was determined by nitrogen adsorption at liquid nitrogen temperature. The data obtained indicated that there was no real relationship between the surface area of the catalysts and their activity.

No great difference in polymer properties was observed when using the different catalysts but the preparations containing TiCl$_{2.8}$ and TiCl$_{2.91}$ gave the polymers of the highest tensile strength.

Thus it is apparent that the new TiCl$_n$-$x$AlCl₃ catalysts are superior to previously used titanium halide catalysts.

TABLE VII.—SUMMARY DATA FROM BOMB POLYMERIZATIONS OF PROPYLENE

| Example No. | Type | Titanium Chloride | | AlEt₃ Mg. | Al/Ti Ratio [b] | Catalyst Efficiency, g./g. | | Mol. Wt. × 10⁻³ |
| --- | --- | --- | --- | --- | --- | --- | --- | --- |
| | 1 l. Bomb | Surf. Area m.²/g.[a] | Mg. | | | On Total | On TiCl$_n$ | |
| 28 | TiCl₃[c] | 25.4 | 70 | 200 | 3.8 | 665 | 2,560 | 225 |
| 29 | TiCl₃[c] | 25.4 | 53.5 | 200 | 5.1 | 530 | 2,520 | 215 |
| 13 | TiCl$_{2.8}$-0.23 AlCl₃ | (3) | 44.9 | 200 | 6.9 | 690 | 4,560 | 170 |
| 20 | TiCl$_{2.67}$-0.25 AlCl₃ | 3.4 | 44.2 | 200 | 7.0 | 915 | 6,250 | 314 |
| 27 | TiCl$_{2.5}$-0.23 AlCl₃ | 33 | 57.1 | 200 | 5.1 | 775 | 4,270 | 254 |
| 21 | TiCl$_{2.67}$-0.25 AlCl₃ | 3.4 | 25.9 | 100 | 6.0 | 1,060 | 6,400 | 250 |
| | 300 ml. Bomb | | | | | | | |
| 33 | TiCl₃[c] | 25.4 | 41.1 | 150 | 5.0 | 514 | 2,400 | 335 |
| 35 | TiCl₃-0.33 AlCl₃ | 96.5 | 52.0 | 100 | 3.35 | 590 | 2,230 | 148 |
| 36 | TiCl₃-0.2 AlCl₃ | 6.4 | 46.6 | 100 | 3.4 | 680 | 2,510 | 167 |
| 34 | TiCl₃[d] | 8.2 | 12.4 | 100 | 11.0 | 191 | 1,730 | 260 |
| 9 | TiCl$_{2.91}$-0.28 AlCl₃ | 23.2 | 10.9 | 100 | 15.0 | 340 | 4,300 | 340 |
| 14 | TiCl$_{2.8}$-0.23 AlCl₃ | (3) | 17.6 | 100 | 8.9 | 830 | 6,730 | 202 |
| 23 | TiCl$_{2.67}$-0.25 AlCl₃ | 3.4 | 13.3 | 100 | 11.6 | 394 | 4,130 | 185 |
| 26 | TiCl$_{2.5}$-0.23 AlCl₃ | 33 | 10.0 | 100 | 10.0 | 519 | 7,015 | 310 |
| 25 | TiCl$_{2.25}$-0.31 AlCl₃ | 22 | 13.6 | 100 | 11.3 | 392 | 4,500 | 300 |
| 15 | TiCl$_{2.8}$-0.23 AlCl₃ | (3) | 11.4 | 50 | 6.9 | 660 | 4,320 | 160 |
| 24 | TiCl$_{2.67}$-0.25 AlCl₃ | 3.4 | 13.8 | 50 | 5.6 | 770 | 4,410 | 165 |
| 38 | TiCl₂-0.08 AlCl₃ | 11.3 | 300 | 450 | 1.7 | 22.6 | 57 | 460 |

[a] The values in parentheses are estimated.
[b] Does not include AlCl₃ in TiCl$_n$ preparation.
[c] Prepared by hydrogen reduction of TiCl₄ at the surface of a hot (>600° C.) platinum filament.
[d] Prepared by hydrogen reduction of TiCl₄ at the surface of a hot (>600° C.) iridium filament.

*Example 39*

The activity of a TiCl$_{2.67}$ catalyst for polymerizing propylene at atmospheric pressure was demonstrated as follows: 1.16 g. of the TiCl$_{2.67}$-0.25 AlCl₃ catalyst prepared according to Example 21, 1.99 g. AlEt₃ and 400 ml. of dry, purified toluene were added to a dry 2 l. glass reactor and stirred under purified nitrogen for 1 hour at 27° C. An additional 1.14 g. AlEt₃ in 100 ml. toluene was added at this time and scrubbed (as in Examples 8–38) propylene was introduced at a rate of 1 l./min. The temperature was slowly increased reaching 44° C. at 10 min., 58° C. at 20 min., 75° C. at 30 min. and 80° C. at 35 min. after the last addition. The appearance of polymer was observed when the temperature reached about 60° C. The polymerization was continued at 80° C. until 2 hours after the last AlEt₃ addition. The polymer was recovered by the addition of 2 volumes of isopropylalcohol and filtering at 50° C. 33.2 g. of solid polymer having an intrinsic viscosity of 2.00 corresponding to a mol. wt. of 117,000 according to the Harris relation (J. of Polymer Science, v. 8 (1952), p. 361) was recovered. This solid polymer had very good physical properties as indicated by high tensile strength 5,400 p.s.i., elongation 30%, soft. pt./melt. pt. 160/163° C., density 0.9035 g. per ml. In addition 2.8 g. of a waxy polymer was recovered from the evaporated combined filtrates.

*Example 40*

The activity of a TiCl$_{2.8}$ catalyst for polymerizing olefins at atmospheric pressure was demonstrated in the following way. 1.74 g. of the TiCl$_{2.8}$ -0.24 AlCl₃ catalyst prepared according to Example 2, 3.14 g. AlEt₃ and 500 ml. toluene were added to a dry 2 l. stirred glass reactor and kept at 25° C. for 1 hour as in Example 39. Propylene was then introduced at a rate of 1 l./min. and the polymerization carried out exactly as in Example 39. 37.8 g. of solid polymer having an intrinsic viscosity of 2.12 corresponding to a mol. wt. of 122,000, according to the Harris relation, was recovered. It had a tensile strength of 5,280 p.s.i., an elongation of 30%, and a soft. pt./melt. pt. of 160/163° C. In addition the polymerization yielded 3.2 g. of waxy polymer from the filtrate.

*Examples 41 and 42*

Whereas a "mixed valence state" between 2 and 3 of the titanium in TiCl$_n$ gave a catalyst of higher activity than pure TiCl₃ or TiCl₂ a "mixed valence state" between 3 and 4 gave a catalyst of considerably lower activity than pure TiCl₃. This is demonstrated in the following Examples 41 and 42. Thus the vastly increased activity of our new catalysts is not just the result of the presence of two valences of titanium (but rather the result of their unique structure). A catalyst having the composition TiCl₃-0.15 TiCl₄-0.33 AlCl₃ was prepared by reduction of an excess of TiCl₄ with the calculated amount of aluminum powder at about 200° C. in a similar manner as was used for the preparations according to Examples 1–7. In spite of its TiCl₄ content the reaction product behaved like a dry powder although its color was darker than that of a TiCl₄-free preparation.

A part of the preparation was thoroughly washed with n-heptane and then dried in vacuo (less than 1 mm. Hg) and about 100° C. This removed the TiCl₄ from the preparation and a TiCl₃-0.33 AlCl₃ catalyst was obtained.

Both the original TiCl₃-0.15 TiCl₄-0.33 AlCl₃ preparation and the TiCl₄ free TiCl₃-0.33 AlCl₃ preparation were tested under identical conditions in atmospheric pressure propylene polymerizations using xylene diluent and AlEt₃ activator. The procedure was as follows: One g. of the TiCl₃ preparation and 0.95 g. AlEt₃ were mixed in 100 ml. dry xylene and stirred for 1 hr. under dry nitrogen in a dry box. The catalyst mixture was then added to a 2 l. stirred glass reactor containing 400 ml. xylene saturated with propylene at 27° C. as well as 0.57 g. AlEt₃. The temperature of the reactor diluent was then increased slowly, reaching 58° C. at 30 min., 67° C. at 60 min., 80° C. at 90 min. and 101° C. at 120 min. in the reaction, respectively. The polymerizations were then continued for another 30 min. at 100–101° C. or for a total of 150 min. Summarized data from the polymerizations with the two catalysts of Examples 41 and 42 are given in Table VIII. The detrimental effect of TiCl₄ present in the catalyst is quite apparent. Not only did the removal of TiCl₄ increase the yield more than 3-fold but it also considerably improved the properties of the solid polymer formed as evidenced by the increase in intrinsic viscosity and percent n-heptane insolubles.

TABLE VIII

| Example No | 41 | 42 |
|---|---|---|
| Ti Halide | TiCl$_3$–0.15 TiCl$_4$–0.33 AlCl$_3$ | TiCl$_3$–0.33 AlCl$_3$ |
| Catalyst Pretreatment: | | |
| Special Notes | Unwashed | n-Heptane washed |
| AlEt$_3$, g | 0.95 | 0.95 |
| Ti Halide, g.[a] | 1.0 | 1.0 |
| Catalyst Conc., g./l | 19.5 | 19.5 |
| Temperature, °C | 27 | 27 |
| Time, min | 60 | 60 |
| Reaction Conditions: | | |
| Volume of Dil. in Reactor, ml | 400 | 400 |
| AlEt$_3$ in Reactor, g | 0.57 | 0.57 |
| Total Weight of Catalyst, g | 2.52 | 2.52 |
| Starting Temperature, °C | 27 | 27 |
| Starting Volume, ml | 500 | 500 |
| Run Length, mm | 150 | 150 |
| Polym. Temp. Range, °C | 80–101 | 47–101 |
| Avg. Catalyst Conc., g./l | 5.0 | 3.8 |
| Results: | | |
| Max. Absorption ml./min | 100 | 450 |
| Yield (total), g | 21 | 65 |
| Waxy Polymer, percent | 19 | 7.7 |
| Properties of Solid Polymer: | | |
| Intrinsic Viscosity | 2.0 | 2.65 |
| Mol. Wt. ×10$^{-3}$ (Harris eq.) | 108 | 170 |
| n-Heptane Insolubles | 72.5 | 84.4 |

[a] Includes AlCl$_3$ present in the preparations.

Example 43

The ability of a "mixed valence state" catalyst to polymerize other olefins than propylene was demonstrated in the following manner: 1.76 g. of a TiCl$_{2.67}$–0.25 AlCl$_3$ catalyst (Example 4) and 3.13 g. AlEt$_3$ were mixed under inert conditions in 100 ml. xylene. The mixture was added to a nitrogen filled dry glass reactor, and stirred at room temperature for 30 min. 400 ml. dry xylene was then added to the reactor, and thoroughly scrubbed (ascarite, drierite and Al(i-Bu)$_3$ scrubbers) ethylene introduced into the reactor at a rate of 1000 ml./min. under continued stirring. The temperature was raised slowly by heating. 52° C. was reached after 10 min. and 65° C. after 20 min. When necessary the propylene feed was increased to 1500 ml./min. The polymerization was allowed to continue at 65° C. until 2 hrs. after the ethylene feed was started. At this time the catalyst was destroyed by the addition of 2 vol. of isopropanol. The polymer-alcohol-diluent mixture was stirred at 70° C. for 10 minutes. The polymer was then filtered off at 50° C. After a second washing with 1 volume (calculated on original diluent volume) isopropanol, 91 g. of a white, fine granular, solid polyethylene was obtained. It had an intrinsic viscosity of 7.12 corresponding to a mol. wt. of 810,000 according to the Harris relation. Its softening point/melting point was 149/157° C.

Example 44

The general usefulness of a "mixed valence state" catalyst for polymerization of α-olefins was further demonstrated in the following experiment in which butene-1 was polymerized to a solid white, plastic material.

The catalyst was prepared and pretreated as in the foregoing example. 400 ml. of xylene was then added to the reactor and thoroughly scrubbed butene-1 introduced into the reactor at a rate of 1000 ml./min. The temperature was raised slowly reaching 78° C. at 30 min., 91° C. at 60 min. and 108° C. at 120 min. in the reaction. The polymerization was terminated after 120 min. and the polymer recovered as in Example 43. 6.1 g. of solid polybutene-1 having an intrinsic viscosity of 1.7 was recovered. The material softened at 95° C. and melted at 103° C. It had a high degree of crystallinity as evidenced by its X-ray diffraction pattern.

What is claimed is:

1. The process which comprises polymerizing an olefinic monomer with the catalyst which results from contacting TiX$_n$ with AlR$_x$X$_y$, where X is halogen, $n$ is 2.5 to 2.9, R is alkyl, $x$ is 2 to 3, and $y$ is 0 to 1.

2. The process which comprises polymerizing alpha olefins with a catalyst which results from contacting TiCl$_{2.5-2.9}$ with an aluminum trialkyl, in which there is some AlCl$_3$ co-crystallized with the TiCl$_{2.5-2.9}$, and the catalyst has an Al/Ti ratio of 0.1–20.0, based on Al in the Al trialkyl.

3. The process of making a high molecular weight solid polypropylene which comprises polymerizing propylene with the catalyst system TiCl$_{2.5-2.9}$ and Al(C$_2$H$_5$)$_3$, at a temperature of about 0 to 100° C. and a pressure of about 1 to 100 atmospheres.

4. The process which comprises polymerizing alpha olefins or terminal diolefins with an alkyl aluminum compound having at least two C$_2$–C$_{20}$ alkyl groups, in combination with a titanium or vanadium halide, wherein the titanium or vanadium has an apparent valence between about 2.25 and 2.9.

5. The process of claim 4 wherein the titanium or vanadium has an apparent valence between about 2.5 and 2.8.

No references cited.

JOSEPH L. SCHOFER, *Primary Examiner.*

M. B. KURTZMAN, *Assistant Examiner.*